Dec. 12, 1939.    A. R. THOMAS    2,182,934
REFRIGERATION
Filed Feb. 19, 1937    3 Sheets-Sheet 1
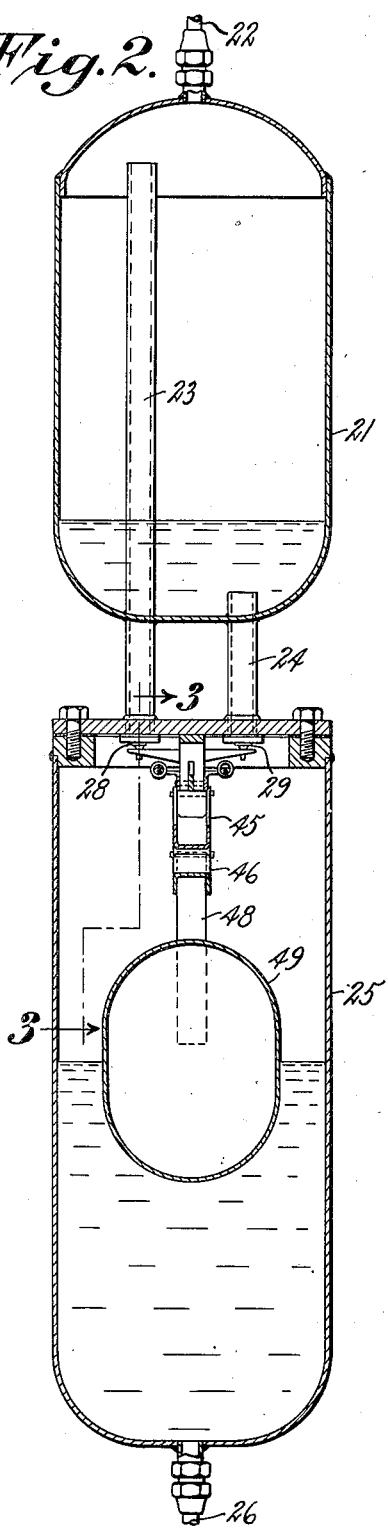
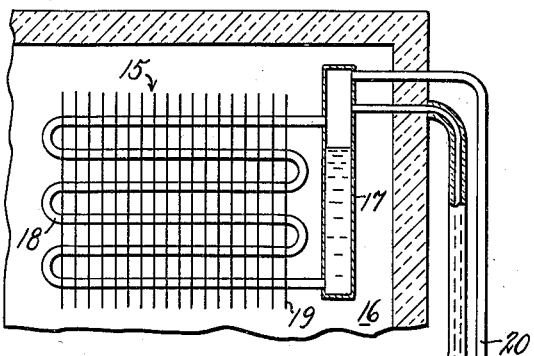
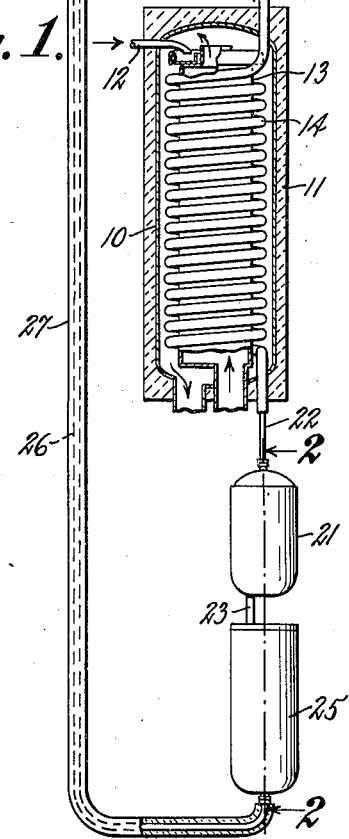
INVENTOR.
Albert R. Thomas
BY
E. M. Fenander
his ATTORNEY.

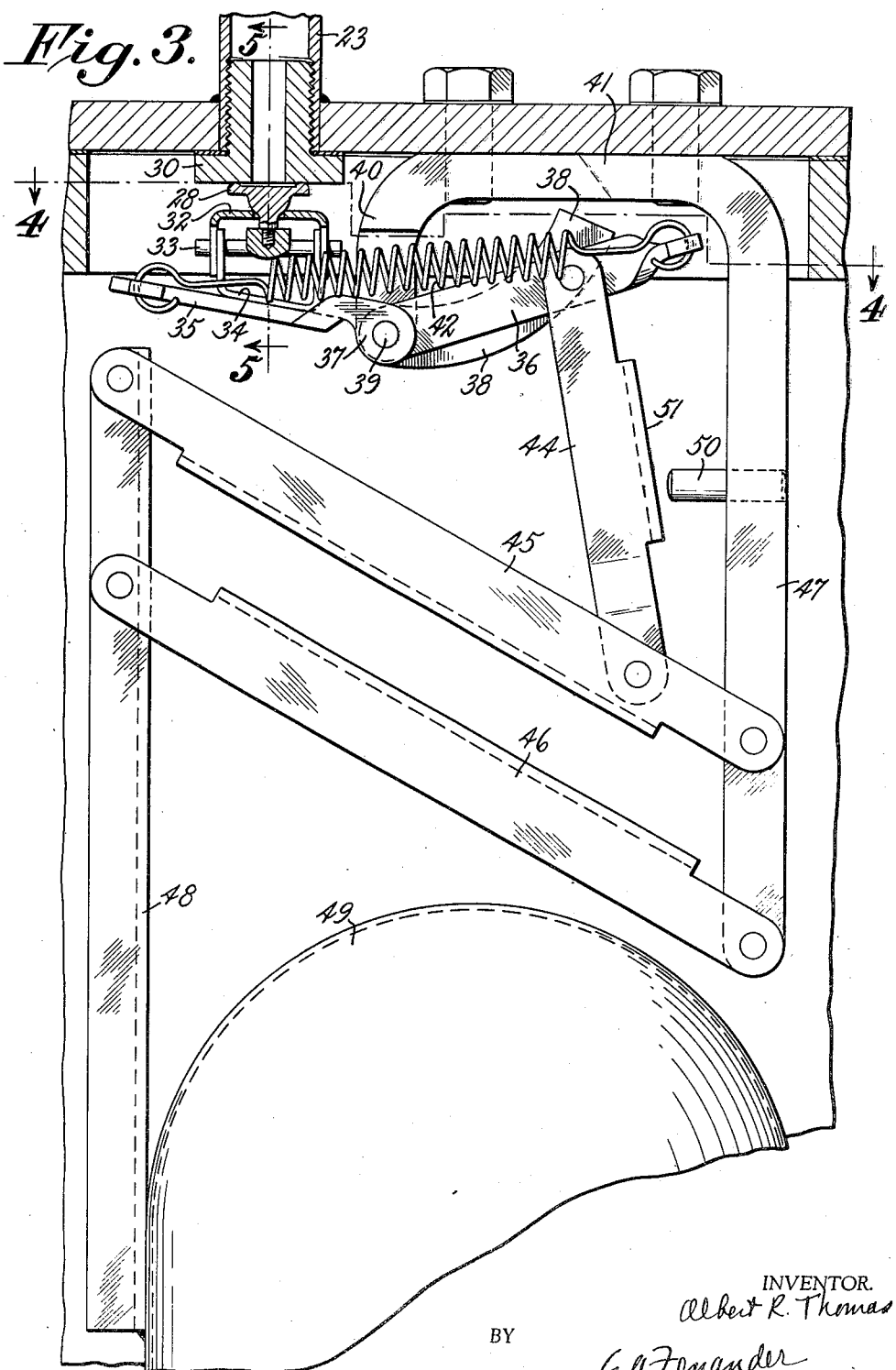

Dec. 12, 1939.  A. R. THOMAS  2,182,934
REFRIGERATION
Filed Feb. 19, 1937   3 Sheets-Sheet 3

INVENTOR.
Albert R. Thomas
BY
E. H. Fenander
his ATTORNEY.

Patented Dec. 12, 1939

2,182,934

UNITED STATES PATENT OFFICE 2,182,934

REFRIGERATION

Albert R. Thomas, Evansville, Ind., assignor to Servel, Inc., New York, N. Y., a corporation of New York Application February 19, 1937, Serial No. 126,598

12 Claims. (Cl. 62—119.5)

My invention relates to refrigeration, and has as an object the provision of an improved system for transferring heat so that cooling may be effectively produced at a place above a source of refrigeration.

Figure 4:
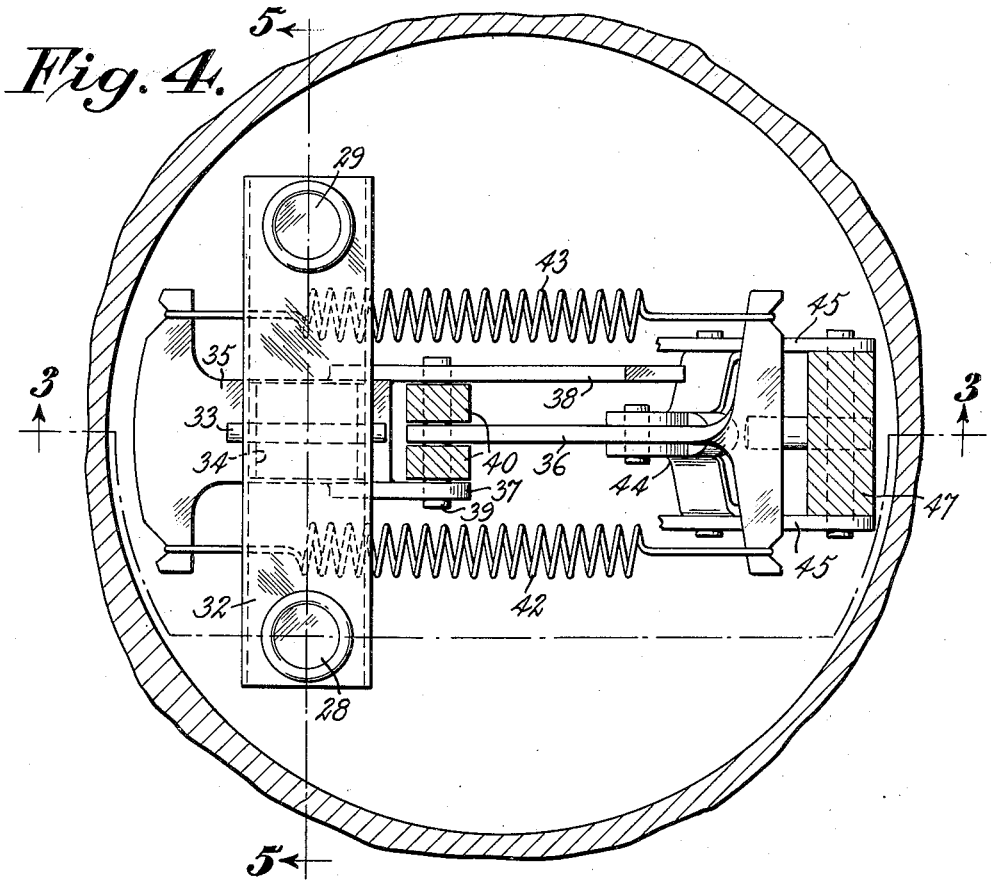
Figure 5:
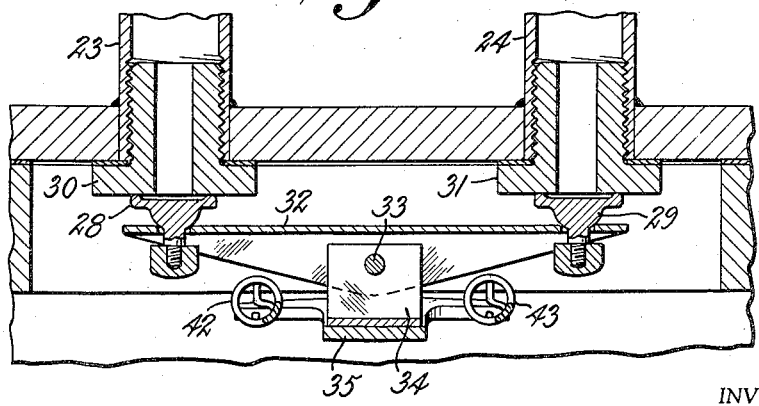

The novel features which I believe to be characteristic of my invention are set forth with particularity in the claims. The invention, both as to organization and method, together with the objects and advantages thereof, will be better understood by reference to the following description taken in connection with the accompanying drawings of which Fig. 1 diagrammatically illustrates a refrigerating system embodying my invention; Fig. 2 is an enlarged vertical section illustrating more clearly parts of the system shown in Fig. 1; Fig. 3 is a sectional view taken on lines 3—3 of Figs. 2 and 4; Fig. 4 is a sectional view view taken on line 4—4 of Fig. 3; and Fig. 5 is a sectional view taken on lines 5—5 of Figs. 3 and 4.

Referring to Fig. 1, I have shown my invention in connection with a cooling unit or evaporator 10 of refrigeration apparatus of a uniform pressure absorption type containing a pressure equalizing gas, and like that described in my application Serial No. 107,852, filed October 27, 1936. The cooling unit 10 constitutes a source of refrigeration and comprises an outer shell which is embedded in heat insulating material 11. A liquid refrigerant, such as ammonia, is introduced into the upper part of the cooling unit 10 through a conduit 12. An inert gas, such as hydrogen, enters the upper part of the cooling unit from the upper end of a cylinder 13 disposed within the shell. The liquid ammonia evaporates and diffuses into the hydrogen with consequent absorption of heat from the surroundings to produce a refrigerating effect. This refrigerating effect is utilized to cool and liquefy a volatile fluid flowing through a coil 14 which is arranged about the cylinder 13 and over the successive turns of which the liquid ammonia descends in sheet-like form.

The resulting gas mixture of ammonia and hydrogen flows from the cooling unit 10 to an absorber in which the ammonia is absorbed into a liquid absorbent such as water. The inert hydrogen gas is returned to the cylinder 13 and the enriched absorption liquid is conducted to a generator. By heating the generator the ammonia is expelled from the absorption solution, liquefied in a condenser, and then returned to the cooling unit 10 through conduit 12 to complete the refrigerating cycle. The weakened absorption solution from which the ammonia has been expelled is conducted from the generator to the absorber to absorb ammonia gas. In order to simplify the drawings, the absorber, generator and condenser of the refrigeration apparatus associated with the cooling unit 10 have not been shown, their illustration not being necessary for an understanding of my invention.

The coil 14, which is arranged within and in thermal relation with the cooling unit 10 of the refrigeration apparatus just described, constitutes the condenser of a heat transfer system forming the subject matter of my present invention. The coil 14, which will hereinafter be referred to as a condenser, is disposed below an evaporator 15 of the flooded-type which is disposed in a thermally insulated storage space 16 that is to be maintained at a desired low temperature. The evaporator 15 includes a receiver 17 and a looped coil 18 which is provided with heat transfer fins 19 and is connected to the receiver 17.

The condenser 14 and evaporator 15 form part of a closed fluid circuit which contains a suitable volatile fluid that evaporates within the evaporator 15 and takes up heat thereby producing cold. The vapor flows from the evaporator 15 through a conduit 20 into the condenser 14, and the vapor is cooled and condensed by the cooling unit 10.

Since the condenser 14 is disposed at a lower level than the evaporator 15, means is provided to return the liquid to the evaporator so that cooling may be constantly produced in the storage space 16. A vessel 21 is connected by a conduit 22 to the lower end of the condenser 14. The upper and lower parts of the vessel 21 are connected by conduits 23 and 24, respectively, to the upper part of a second vessel 25. The lower end of the vessel 25 is in turn connected by a conduit 26 to the receiver 17 for returning liquid to the evaporator 15. The conduit 26 is preferably provided with a heat insulating covering 27 to prevent excessive evaporation of liquid in this conduit.

The lower ends of the conduits 23 and 24 are adapted to be intermittently closed and opened by valves 28 and 29 to control the flow of liquid from the vessel 21 into the vessel 25. Referring more particularly to Figs. 3 to 5 inclusive, the valves 28 and 29 are adapted to bear against valve seats 30 and 31 formed at the lower ends of the conduits 23 and 24. The valves 28 and 29 are mounted on the ends of a cross plate 32 which is connected intermediate its ends by a pin 33 to a bracket 34.

The bracket 34 is secured to an arm 35 which cooperates with an arm 36 for moving the valves 28 and 29 to and from their closed position. The inner end of the arm 35 is provided with spaced side members 37 and 38 which are pivotally connected by a pin 39 to the short downwardly extending arm 40 of an inverted U-shaped bracket 41 secured to the upper end of the vessel 25. The side member 38 is considerably longer than the side member 37 and is curved upwardly and contacts the upper end of the vessel 25 to limit the extent of movement of the valves 28 and 29 when they are moved to their open position. The inner end of the arm 36 is also pivotally connected by the pin 39 to the short arm 40 of the bracket 41 and is offset with respect to the side members 37 and 38.

The outer ends of the arms 35 and 36 are connected by a pair of coil springs 42 and 43 to provide a snap-acting toggle mechanism. To the arm 36 is pivotally connected the upper end of a lever 44 having a lower forked end which is pivotally connected to the sides of a lever 45 which is U-shaped in section, as shown in Fig. 2. An end of the lever 45, and also an end of a parallel lever 46 disposed below the lever 45, are pivotally connected to the downwardly extending longer arm 47 of the bracket 41. The opposite ends of the levers 45 and 46 are pivotally connected to the upper end of a vertical lever 48 which is secured at its lower end to a float 49. The longer arm 47 of the bracket 41 is provided with a pin 50 which is in the path of movement of the outer end of the lever 36 to limit the downward movement of the latter when the valves 28 and 29 are moved to their open position. The upward movement of lever 36 and float 49, when valves 28 and 29 are moved to their closed position, is limited by the upper horizontal portion of bracket 41.

During operation, vapor formed in the evaporator 15 flows through the conduit 20 into the condenser 14 in which the vapor is condensed. The condensed fluid flows from the condenser 14 through conduit 22 into the vessel 21. When the liquid level in the vessel 25 is a definite distance below a predetermined level, the valves 28 and 29 are in their open position and liquid flows through conduit 24 into the vessel 25. When the liquid in the vessel 25 reaches the predetermined level, the float 49 has moved upward sufficiently to cause the arm 36 to move past the dead-center position of the arms 35 and 36 whereby the coil springs 42 and 43 move the valves to their closed position.

The liquid in the vessel 25 forms a liquid column in the lower part of this vessel and the lower part of the conduit 26. Liquid in the vessel 25 evaporates due to heat transfer from the surrounding warmer air which may be at ordinary room temperature, and the vapor thus formed is trapped or confined in the upper part of the vessel. The vapor pressure in the upper part of the vessel 25 continues to increase due to evaporation of liquid and, when this vapor pressure is sufficiently great, liquid is forced upward in the conduit 26 and into the receiver 17 of the evaporator 15.

When the quantity of liquid leaving the vessel 25 is such that the liquid level falls the definite distance below the predetermined liquid level, the arm 36 has been moved downward past the dead-center position of the arms 35 and 36 by the float 49, whereby the coil springs 42 and 43 move the valves 28 and 29 to their open position. The vapor in the upper part of the vessel 25 flows through conduit 23 into the upper part of the vessel 21 to equalize the vapor pressures in the vessels 21 and 25, and liquid will then flow through conduit 24 into the vessel 25 to replace liquid that has been returned to the evaporator 15. When the liquid in the vessel 25 has again reached the predetermined level the valves 28 and 29 are moved to their closed position, and a confined body of vapor is again formed in the upper part of the vessel 25 to force liquid through conduit 26 and into the receiver 17.

The heat transfer system just described is substantially a uniform pressure system and operates continuously to transfer heat from the storage space 16 to the cooling unit 10 and thereby maintain the former at a desired low temperature. While fluid is constantly vaporizing in the evaporator 15 and condensing in the condenser 14 due to the cooling effected by the cooling unit 10, the mechanism within the vessel 25 operates automatically to return liquid intermittently to the evaporator 15 due to evaporation of liquid in the vessel 25.

Although I have shown and described a particular embodiment of my invention, it will be apparent to those skilled in the art that modifications may be made without departing from the spirit and scope of the invention as pointed out in the following claims.

What is claimed is:

1. A system of the character described comprising an evaporator, a condenser disposed below said evaporator, means for cooling said condenser to effect vaporization of volatile fluid in said evaporator and condensation of the vaporized fluid in said condenser, structure forming a chamber disposed below said condenser for receiving condensed fluid therefrom, a rising conduit for conducting condensed fluid from said chamber to said evaporator, means responsive to liquid level in said chamber for alternately admitting condensed fluid into a part of said chamber in unobstructed communication with said rising conduit and closing communication with said part above the surface level of liquid therein, and said structure being constructed and arranged to permit evaporation of condensed fluid to form vapor in said part to force liquid therefrom upward in said rising conduit.

2. A system of the character described comprising an evaporator, a condenser disposed below said evaporator, means for cooling said condenser to effect vaporization of volatile fluid in said evaporator and condensation of the vaporized fluid in said condenser, structure for returning condensed fluid to said evaporator and forming a chamber disposed below said condenser for receiving condensed fluid therefrom, a rising conduit for conducting condensed fluid from said chamber to said evaporator, a valve, and a float within said chamber operatively connected to said valve for controlling the flow of condensed fluid into said chamber, said structure being constructed and arranged to permit evaporation of condensed fluid and to form a body of vapor in a part of said chamber when said valve is closed to force liquid therefrom upward in said rising conduit.

3. A system of the character described comprising an evaporator, a condenser connected to said evaporator and disposed below the latter, said condenser being adapted to be cooled to effect vaporization of volatile fluid in said evaporator and condensation of the vaporized fluid in said condenser, a vessel disposed below and connected to the lower part of said condenser, a second vessel disposed below said first vessel, a conduit connecting the upper part of said first vessel and said second vessel, a second conduit connecting the lower part of said first vessel and said second vessel permitting flow of condensed fluid from the former into the latter, a rising conduit connecting said second vessel and said evaporator, valves controlling flow of fluid in said first and second conduits, and a float within said second vessel operatively connected to said valves, said second vessel being constructed and arranged to permit evaporation of condensed fluid to form a body of vapor therein.

4. A system of the character described comprising an evaporator, a condenser disposed below said evaporator, said condenser being adapted to be cooled to effect vaporization of volatile fluid in said evaporator and condensation of the vaporized fluid in said condenser, and structure forming an upper chamber and a lower chamber for returning fluid condensed in said condenser to said evaporator, said upper chamber being adapted to receive and accumulate fluid condensed in said condenser, said structure being constructed and arranged to equalize the pressures in said chambers and permit flow of liquid from said upper chamber into said lower chamber during periods alternating with periods during which said lower chamber is closed with respect to said upper chamber and liquid evaporates to form a body of vapor in said lower chamber which acts against a column of liquid condensate and lifts liquid upwardly into said evaporator.

5. A system of the character described comprising an evaporator, a condenser disposed below said evaporator, means for cooling said condenser to effect vaporization of volatile fluid in said evaporator and condensation of the vaporized fluid in said condenser, structure forming a chamber below said condenser for receiving fluid condensed in the latter, a rising conduit for conducting condensed fluid from said chamber to said evaporator, a valve, a float, snap-acting toggle mechanism operatively connecting said float to said valve for alternately admitting condensed fluid into a part of said chamber in unobstructed communication with said rising conduit and closing communication with said part above the surface level of liquid therein, and said structure being constructed and arranged to permit evaporation of condensed fluid to form a body of vapor in said part which acts against condensed fluid in said rising conduit portion and lifts liquid upwardly into said evaporator.

6. A method of heat transfer which includes simultaneously vaporizing liquid fluid in a place of vaporization at an upper elevation, condensing vaporized fluid in a place of condensation at an elevation below the aforesaid elevation, collecting the condensate to form a body of liquid, alternately confining and releasing vapor above said body to exert vapor pressure variations on said body and utilizing such pressure variations to cause liquid of said body to flow from said body upward to said place of vaporization.

7. A method of heat transfer as set forth in claim 6 in which released vapor is conducted directly to said place of condensation.

8. A method of heat transfer as set forth in claim 6 in which the alternately confined and released vapor is formed by continuous transfer of heat to liquid below the surface level of said body of liquid.

9. A heat transfer system including a circuit for heat transfer fluid, said system having the place of vaporization at an upper elevation, a place of condensation at a lower elevation, and means for raising liquid from said lower elevation to said upper elevation including a vessel for holding liquid in the lower part thereof and adapted to hold vapor above the surface level of liquid therein, a conduit from the lower part of said vessel to said place of vaporization at said upper elevation, said vessel being connected in the system to receive liquid condensed in the place of condensation, and means for intermittently releasing vapor from said vessel and admitting condensate thereto from said place of condensation to cause rise in level of liquid in said vessel, such rise in level of liquid in said vessel alternating with fall in level of liquid in said vessel and upward flow of liquid in said conduit when liquid is raised from said lower elevation to said upper elevation.

10. A heat transfer system as set forth in claim 9 having a conduit for released vapor from said vessel to said place of condensation.

11. A heat transfer system as set forth in claim 9 having means to operate said vapor releasing means responsive to variation in level of liquid in the vessel.

12. A heat transfer system as set forth in claim 9 having valve mechanism to connect and disconnect said vessel with said place of condensation to release vapor thereto and admit liquid therefrom, and a float for operating said valve mechanism responsive to variation in level of liquid in the vessel.

ALBERT R. THOMAS.